No. 630,042. Patented Aug. 1, 1899.
C. E. FOSTER.
CONTROLLING DEVICE FOR ELEVATORS.
(Application filed Apr. 14, 1892.)

(No Model.)

Witnesses
J. G. Hinkel
Harry E. Hay.

Inventor
Charles E. Foster
by Foster Freeman
Attorneys

UNITED STATES PATENT OFFICE.

CHARLES E. FOSTER, OF WASHINGTON, DISTRICT OF COLUMBIA, ASSIGNOR TO THE OTIS ELEVATOR COMPANY, OF EAST ORANGE, NEW JERSEY.

CONTROLLING DEVICE FOR ELEVATORS.

SPECIFICATION forming part of Letters Patent No. 630,042, dated August 1, 1899.

Application filed April 14, 1892. Serial No. 429,205. (No model.)

*To all whom it may concern:*

Be it known that I, CHARLES E. FOSTER, a citizen of the United States, and a resident of Washington, District of Columbia, have invented certain new and useful Improvements in Controlling Devices for Elevators, of which the following is a specification.

My invention relates to that class of controlling devices for elevators in which standing cables are used—that is, cables secured at their one end to supports at one end of the well and connected at their opposite ends with the stopping and starting device; and my invention consists in certain parts constructed and arranged as fully set forth hereinafter so as to form the said cables into bights or loops, the contracting and relaxing of which will shift the stopping and starting device, and of movable pulleys or sheaves upon the cage whereby to extend and permit the contraction of the said loops or bights, as fully set forth hereinafter and as illustrated in the accompanying drawings, in which—

Figure 1:
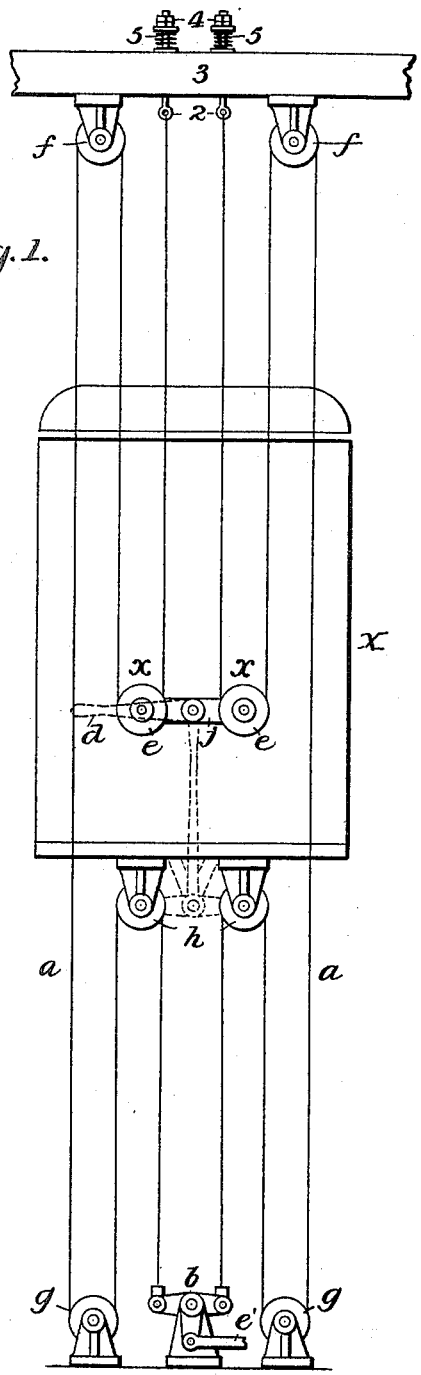
Figure 2:
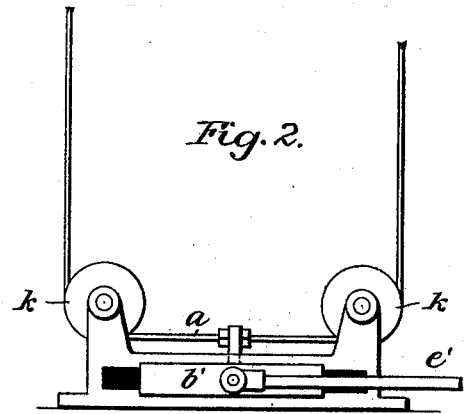

Figure 1 illustrates the controlling device having two cables in connection with the cage and stopping and starting lever of an elevator. Fig. 2 is a view illustrating a different manner of connecting the cable device with the stopping and starting device.

The cage or platform X is of any suitable construction and is raised and lowered by any suitable engine, either steam, hydraulic, pneumatic, or electric, as may be desired, which engine is provided with a valve or switch or other stopping and starting device. The said controlling device is operated from the cage through a medium of two standing cables $a$ $a$—that is, cables which are connected at their one end to a fixed eyebolt or support 2 and at the other end to a lever $b$ or other device which is connected with the stopping and starting device—so that the shifting of the position of the lever or its equivalent will be the means of shifting the stopping and starting device so as to start the cage in either direction, stop it when moving in either direction, or reverse its motion.

The shifting of the device $b$ is effected by lengthening or contracting bights or loops formed in the cables $a$, and for the purpose of forming said loops or bights each cable is passed around a sheave $e$, which may be moved in respect to the cage by any suitable appliance within the cage—as, for instance, by means of a handle $d$—and the cable passes upward over a guide-pulley $f$ and down around another guide-pulley $g$ and back and around a guide-pulley $h$, turning upon bearings upon the cage. The guide-pulley $f$ is at one end of the well, and the guide-pulley $g$ turns in fixed bearings at the opposite end of the well, and by moving the pulleys $e$ upon the cage by means of the lever $d$ or its equivalent the bight or loop $x$ in each cable $a$ may be lengthened or relaxed, so as to impart a corresponding movement to the device $b$.

As shown in Fig. 1, the cage is provided with two pulleys $e$ $e$, mounted upon opposite ends of a lever $j$, pivoted between them, and the cage also carries two pulleys $h$, and there are two guide-pulleys $g$ $g$ at the bottom of the well and two guide-pulleys $f$ $f$ at the top of the well, and each cable $a$ passes from the eyebolt 2 around one of the sheaves $e$ and around one of the upper guide-pulleys $f$ and lower guide-pulleys $g$ and around one of the pulleys $h$ upon the cage and back to one end of the lever $b$. The lever $j$ is connected with the hand-lever $d$ within the cage, and by rocking the lever $j$ by means of a hand-lever the bight $x$ in one cable is relaxed and that of the other cable is elongated and a positive movement in one direction or the other is imparted to the stopping and starting device.

The device $b$ in Fig. 1 is a lever; but in Fig. 2 the cables $a$ are joined to make practically one cable, which passes around guide-pulleys $k$ $k$ and between said guide-pulleys is connected with a stud upon the shifting device, which is in the form of a slide $b'$, connected to the rod $e$, that leads to the controlling device.

The pulley or pulleys $h$ may be at the bottom of the cage or they may be at the top of the cage.

It is of course immaterial whether the device $b$ be at the upper or lower end of the well, provided it be connected with the stopping and starting device and provided that one end of the cable or cables be connected with the device $b$ and the other end with a fixed support at the opposite end of the well.

It is evident that the pulleys $e$ might turn in fixed bearings and the pulleys $h$ be shifted, as in apparatus in common use and as illustrated in dotted lines, Fig. 1.

It will be seen that each cable has four loops or bights, two above and two below the pulleys on the cage, so that as the cable is taken up by one of the cage-pulleys in moving in one direction it is paid out by the like movement of the other cage-pulley, there being no draft upon the cable from these movements of the pulleys, while the shifting of the vertical position of either pulley upon the cage would take up or relax the bight and shift the stopping and starting device.

Instead of counterbalancing the guide-pulleys at the end of the well the fast end of each cable may be attached to an eyebolt 2, Fig. 1, extending through a fixed bearing 3 and carrying a nut 4, bearing on a spring 5, which will yield if the cable contracts and expands and keep the cable taut if it elongates.

Without limiting myself to the precise construction and arrangement of parts shown and described, I claim—

1. The combination with the cage, and stopping and starting device of an elevator, of two cables, one end of each cable being fixed to a fixed support in the well, and the other end of each cable being connected with the starting and stopping device of the elevator, two pulleys for each cable which are supported in the well, and two pulleys for each cable connected to the car, one of which pulleys is adjustable, each cable passing around the two pulleys in the well and the two pulleys on the cage, substantially as described.

2. The combination with the cage, and starting and stopping device of an elevator, of two cables, each cable having four loops or bights, two extending above the cage and two extending below the cage, two pulleys for each cable supported in the well, and two pulleys for each cable supported on the car, one of which pulleys on the car is adjustable, there being a pulley in the well or on the car for each bight of each cable, and the whole being so arranged that when the adjustable pulleys on the car are moved the cable is taken up by one of the car-pulleys moving in one direction, and is paid out by a like movement of the other pulley moving in the other direction and the stopping and starting device is thereby shifted, substantially as described.

In testimony whereof I have signed my name to this specification in the presence of two subscribing witnesses.

CHARLES E. FOSTER.

Witnesses:
   J. S. BARKER,
   G. P. KRAMER.